(No Model.)
D. M. REED.
CABBAGE HARVESTER.
No. 576,326. Patented Feb. 2, 1897.
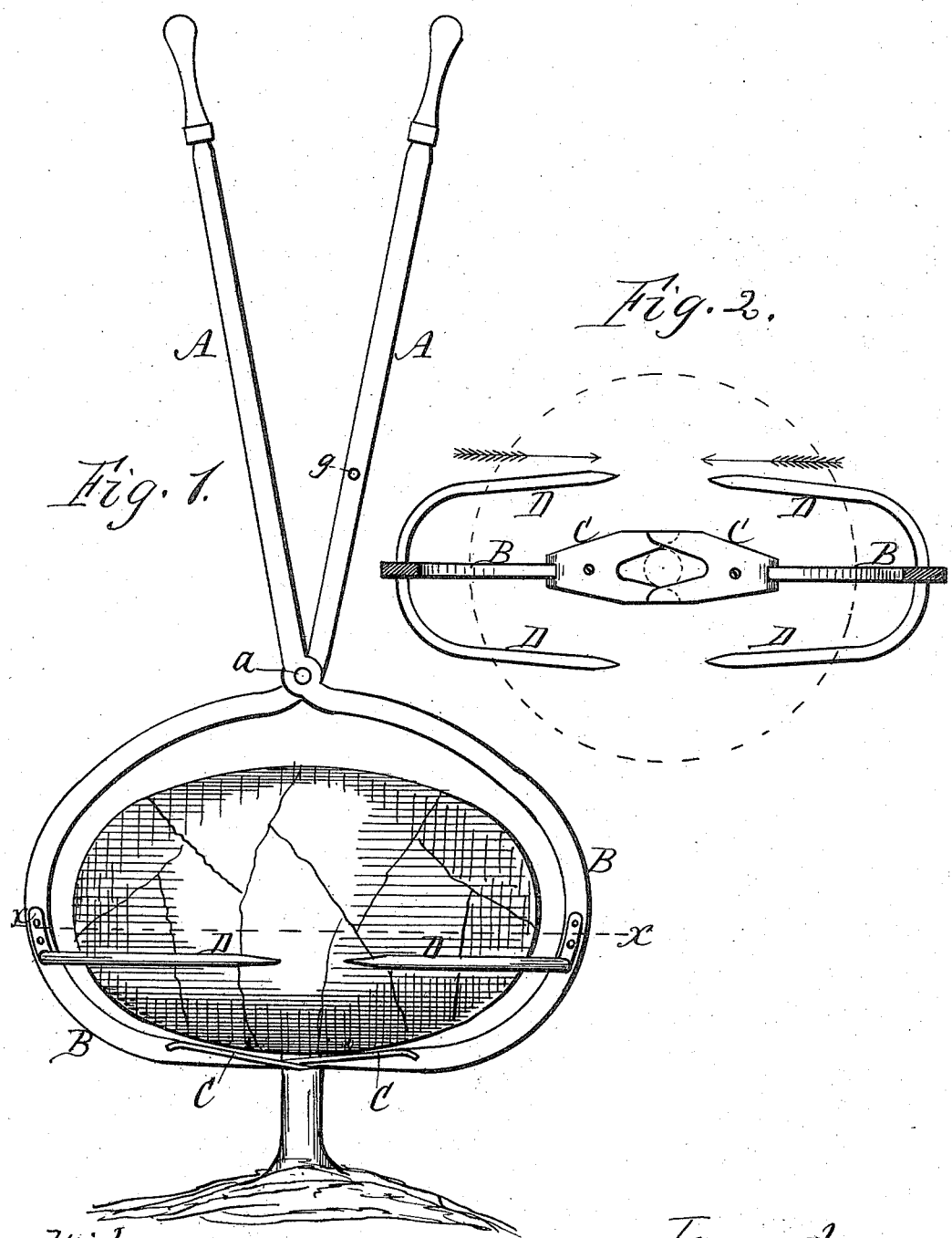

UNITED STATES PATENT OFFICE.

DANIEL M. REED, OF BROCKPORT, NEW YORK.

CABBAGE-HARVESTER.

SPECIFICATION forming part of Letters Patent No. 576,326, dated February 2, 1897.

Application filed April 17, 1896. Serial No. 587,940. (No model.)

*To all whom it may concern:*

Be it known that I, DANIEL M. REED, of Brockport, in the county of Monroe and State of New York, have invented a certain new and useful Improvement in Cabbage-Harvesters; and I do hereby declare that the following is a full, clear, and exact description of the same, reference being had to the drawings accompanying this application.

My improvement relates to devices for cutting cabbages from the stems. This work is usually done by a spade or knife. As the stem of the cabbage is large and tough, the work is slow and imperfectly done.

My invention consists of a device for the purpose, constructed, arranged, and operating as hereinafter more fully described, and embodied in the claim.

In the drawings, Figure 1 is an elevation of the device in the act of cutting a cabbage from its stem. Fig. 2 is a horizontal section in line $xx$ of Fig. 1, looking downward on the cutters.

The device consists of two levers A A, crossing each other like tongs, being pivoted at $a$, and the lower ends forming two curved jaws B B of sufficient spread to receive the largest head of cabbage between them. To the inner end of these jaws are attached knives C C for cutting the stem beneath the cabbage-head. These knives are of the form shown, being notched or concaved on their inner edges, so as to embrace the stem and produce a shearing cut as they close together. They are attached to the jaws in such a manner that they slide one over the other in close contact, thereby producing a shearing cut. The edges of the cutters are beveled on the under side and are flat on the upper side, by which means as they close together the tendency is to cut upward toward the head, thereby leaving no undue projection of the stem on the head.

D D are fingers forming guards, two being attached to each jaw on opposite sides. They are curved outward, and the free ends project toward each other substantially in line with the knives. These guards, instead of being attached to the jaws, may be attached to the knives, if desired. When the jaws are closed upon the cabbage, the guards embrace it and hold the head after it is cut off. $g$ is a pin on one of the levers A, forming a stop to the other lever in closing and gaging the throw of the cutters as they come together.

In use the two jaws are opened, so as to pass under and embrace the cabbage-head, the knives being brought close up to the cabbage-head. The jaws are then closed together by operating the cross-levers, and the knives closing on the stem sever the same by a quick cut, leaving the cabbage-head supported on the guard-arms, so that it can be moved to the place of deposit and there released by opening the jaws.

This device is of great service in harvesting cabbages, as the work is done very rapidly and in the most effective manner. The cut is made square across the stem close up to the head without injuring the latter. When the head is cut with a spade or knife, the work is irregular and the head is frequently injured. It is impossible to harvest all the heads in a field at once, as some mature earlier than others. Hence a hand instrument is required.

Having described my invention, what I claim as new, and desire to secure by Letters Patent, is—

In a cabbage-harvester, the combination, with the pivoted jaws having curved lower ends to pass around the cabbage, of knives attached to the ends of said jaws, arranged to engage together and produce a shearing cut, said knives being notched in V form to embrace the stem; and guards attached to the jaws, said guards consisting of fingers curved outward laterally and projecting forward parallel with the jaws, and forming a receptacle for holding the cabbage when cut, as herein shown and described.

In witness whereof I have hereunto signed my name in the presence of two subscribing witnesses.

DANIEL M. REED.

Witnesses:
R. F. OSGOOD,
C. R. OSGOOD.